UNITED STATES PATENT OFFICE.

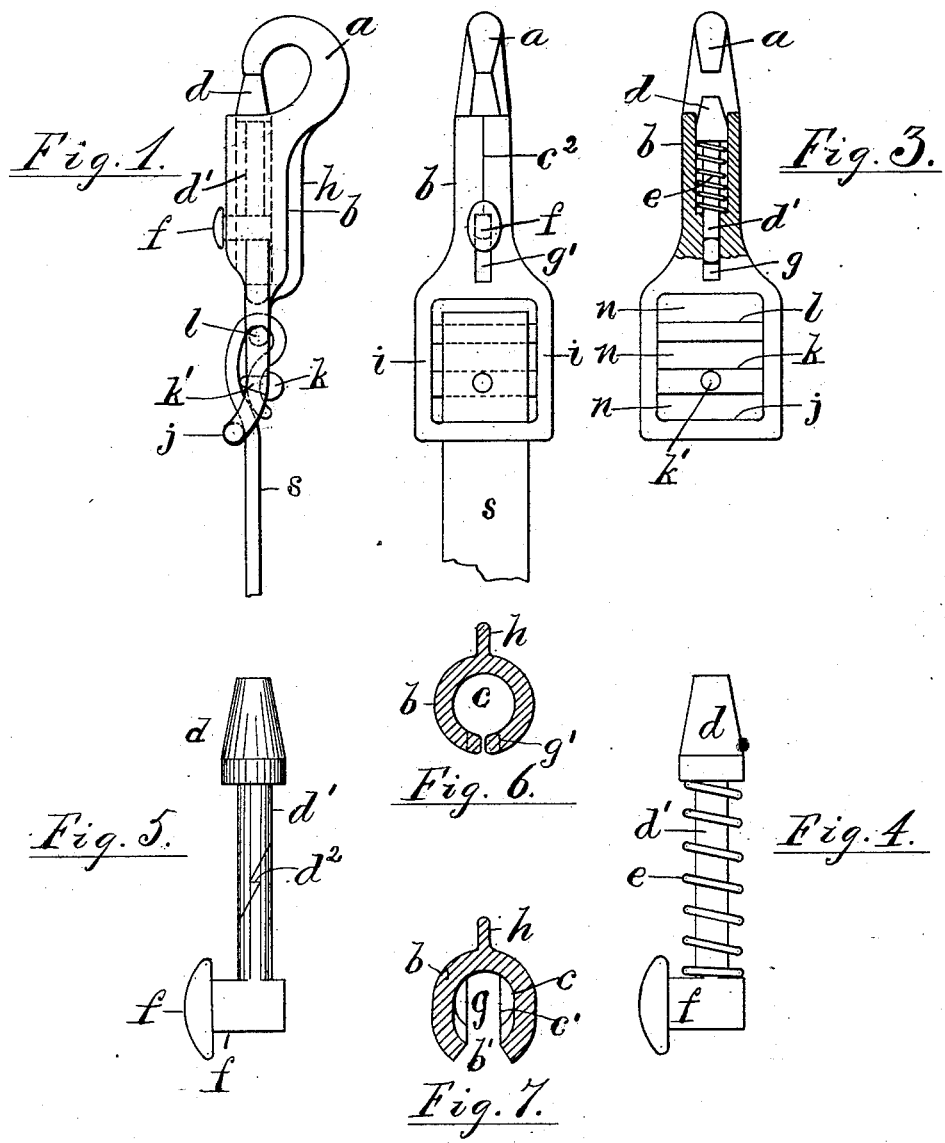

EMERY E. HARDY, OF NEWARK, NEW JERSEY, ASSIGNOR TO ALBINA M. HARDY, OF SAME PLACE.

SNAP-HOOK.

SPECIFICATION forming part of Letters Patent No. 360,522, dated April 5, 1887.

Application filed June 29, 1886. Serial No. 206,590. (No model.)

*To all whom it may concern:*

Be it known that I, EMERY E. HARDY, a citizen of the United States, residing in Newark, Essex county, New Jersey, have invented certain new and useful Improvements in Snap-Hooks, fully described and represented in the following specification and the accompanying drawings, forming a part of the same.

This invention relates to that class of snap-hooks in which a sliding bolt is fitted within the shank of the hook; and my improvements consist, partly, in the combination, with the bolt-socket, of a longitudinal slot in one side at its lower end and a bolt provided with a stud at its lower end adapted to fit the said slot, and partly in a particular construction of the bolt with a reduced stem to fit a spiral spring, in combination with a cylindrical socket having a flattened recess continuous with its lower end to fit said stem, and to form shoulders for the inner end of the spring.

In the drawings, Figure 1 is a side view of the snap-hook combined with an integral buckle, showing part of a strap attached. Fig. 2 is a front view of the same. Fig. 3 is a front view of the same with the strap removed and the socket shown in section for nearly its entire length. Fig. 4 is a detached view of the bolt and its spring upon a larger scale. Fig. 5 is a detached view of the bolt with a divided stem. Fig. 6 is a section of the socket on line $x$ $x$ in Fig. 2, and Fig. 7 is a section of the same when cast with an opening to admit the stud of the bolt and before it is closed upon the same.

$a$ is the hook; $b$, the shank of the same, by which it is attached to the buckle and to the strap $k$.

$c$ is the socket within the shank, shown in Figs. 2 and 6 as split open at $c^2$ upon its front side adjacent to the upper end, and provided at its lower end with a flattened recess, $g$, continuous therewith, a longitudinal slot, $g'$, being formed in the side of the socket adjacent to the recess, to receive a stud upon the bolt. The bolt is formed at its outer end with a head, $d$, and at its inner end with the stud $f$, the two being joined by a reduced stem, $d'$, around which a spiral spring, $e$, is wound.

The outer end of the spiral spring bears against the head $d$, and its inner end against the shoulders $e'$, which are formed by the contraction of the cylindrical part of the socket into the flattened part or recess $g$.

The spring operates normally to thrust the bolt outward and to draw the stud to the upper end or outer end of the slot $g'$, as shown in Figs. 1 and 2, the movement of the stud downward in said slot serving to retract the bolt when desired, as is shown in the partial section in Fig. 3, in which the neck of the stud is sectioned, although the bolt and its spring and stem are not shown in section.

The location of the stud at the inner end of the bolt affords the required space upon its stem $d'$ for the application of the spring $e$. Such arrangement of the stud also locates it more remote from the hook $a$ and bolt $d$, so that the application of the thumb or finger to the stud in retracting the bolt is less likely to interfere with the application of the snap-hook than when located near the outer end of the bolt or its socket, as in previous constructions.

The spring $e$ may be formed by winding a wire of suitable length upon the stem $d'$; or it may be coiled separately and applied to the stem by twisting it or screwing it over the head $d$.

The stem may also be divided, as shown in Fig. 5, upon an oblique line, the opposed parts being provided with interlocking projections $d^2$, so that when embraced by the spring and inserted in the socket the parts of the bolt would be sufficiently secured together to operate as desired.

To permit the introduction of the stud $f$ into the slot $g'$, the upper part of the socket is preferably cast with an opening, $b'$, (shown in Fig. 7,) at its front side, of the same width as the recess $g$ and slot $g'$, the socket being formed of malleable metal, so that it may be pressed into cylindrical form, as shown in Fig. 6, after the bolt and its stud are inserted.

A rib, $h$, is shown formed upon the back of the shank, to connect the same more rigidly with the base of the hook $a$, and the shank is formed integral with a buckle, consisting in two side bars, $i$, and three cross-bars, $j$ $k$ $l$, forming three slots, $n$, transverse to the shank at its lower end, through which a strap, $s$, may be inserted in a variety of ways to secure the snap-hook thereto.

A pin, $k'$, is applied to one of the cross-bars $k$, and a hole formed in the strap is applied to such pin and the strap bent through the several slots $n$, so as to hold the same upon the pin.

Having thus set forth the nature and objects of my invention, what I claim is—

1. The combination, with the hook $a$ and its shank $b$, having cylindrical socket $c$ and flattened recess $g$, continuous therewith, forming shoulders $c'$, of the bolt-head $d$ and its reduced stem $d'$, having the stud $f$ at its lower end, and the spring $e$, applied to the bolt within the socket, with its ends bearing against the head $d$ and the shoulders $c'$, as and for the purpose set forth.

2. The combination, with the hook $a$, provided with the shank $b$ and the longitudinal socket, formed with opening $b'$ at its front side, and the recess $g$, provided with a longitudinal slot, $g'$, in one side, of the spring $e$ and bolt formed with head $d$, reduced stem $d'$, and stud $f$ at its lower end, the opening at the front side of the socket being closed upon the bolt and spring, substantially as herein shown and described, and for the purpose set forth.

In testimony whereof I have hereunto set my hand in the presence of two subscribing witnesses.

EMERY E. HARDY.

Witnesses:
 HENRY J. MILLER,
 HENRY J. THEBERATH.